United States Patent [19]

Trumbull

[11] Patent Number: 4,477,160

[45] Date of Patent: Oct. 16, 1984

[54] MOTION PICTURE SYSTEM

[75] Inventor: Douglas Trumbull, Santa Monica, Calif.

[73] Assignee: Showscan Film Corporation, Marina del Rey, Calif.

[21] Appl. No.: 412,040

[22] Filed: Aug. 26, 1982

Related U.S. Application Data

[63] Continuation-in-part of Ser. No. 885,901, Mar. 13, 1978, abandoned, which is a continuation-in-part of Ser. No. 713,658, Aug. 12, 1976, abandoned, which is a continuation-in-part of Ser. No. 626,965, Oct. 29, 1975, abandoned.

[51] Int. Cl.³ .............................................. G03B 21/32
[52] U.S. Cl. ....................................... 352/40; 352/44; 352/69; 352/86; 352/180; 352/198
[58] Field of Search ...................... 352/44, 86, 41, 198, 352/200, 143, 146, 39, 191, 194, 38, 40, 43, 69, 84, 85, 232, 239, 180, 201

[56] References Cited

U.S. PATENT DOCUMENTS

| | | | |
|---|---|---|---|
| 2,834,832 | 5/1958 | Scmers | 352/191 |
| 3,671,113 | 6/1972 | Johnson | 352/194 |
| 3,788,736 | 1/1974 | Oulevay | 352/169 |

OTHER PUBLICATIONS

"New Movie Technology", by G. Christian Hill, The Wall Street Journal, Sep. 14, 1983.
ANSI Standard PH22.196—1978.
"From Reel to Reel", by Richard Harrington, Washington Post, Feb. 25, 1984.
"Through the Lens of the Beholder", by Richard Harrington, Washington Post, Mar. 11, 1984.
"Home Movies", by Lenny Lipton, Super 8 Filmaker, May/Jun. 1974.

Primary Examiner—Russell E. Adams
Attorney, Agent, or Firm—Freilich, Hornbaker, Rosen & Fernandez

[57] ABSTRACT

A method is described for producing and projecting a theater quality entertainment motion picture, by photographing and then projecting the motion picture on a screen, which creates an unusually vivid impression of realism. The film frames have a resolution of over 40 line pairs per milimeter, and each frame has an area of at least 0.36 square inch, which creates more then 10 million pixels per frame on the film and on the screen. The illumination level on the screen is at least 15 foot lamberts. The film frames are photographed and projected at a predetermined constant rate of more than 50 frames per second, such as 60 fps. The high resolution and light level, combined with the unusually high frame rate, has been found to produce an unusually vivid impression of realism.

5 Claims, 12 Drawing Figures

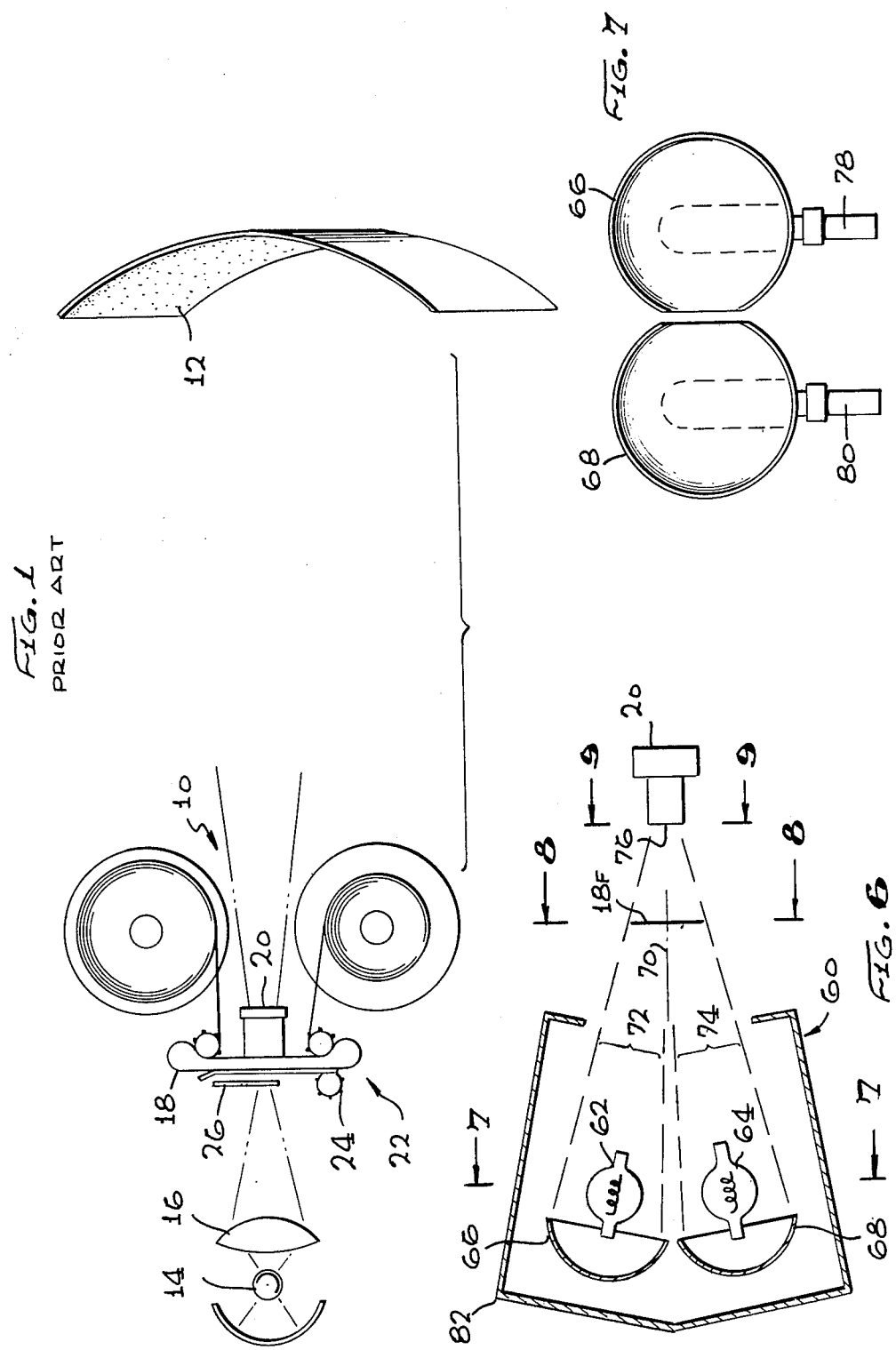

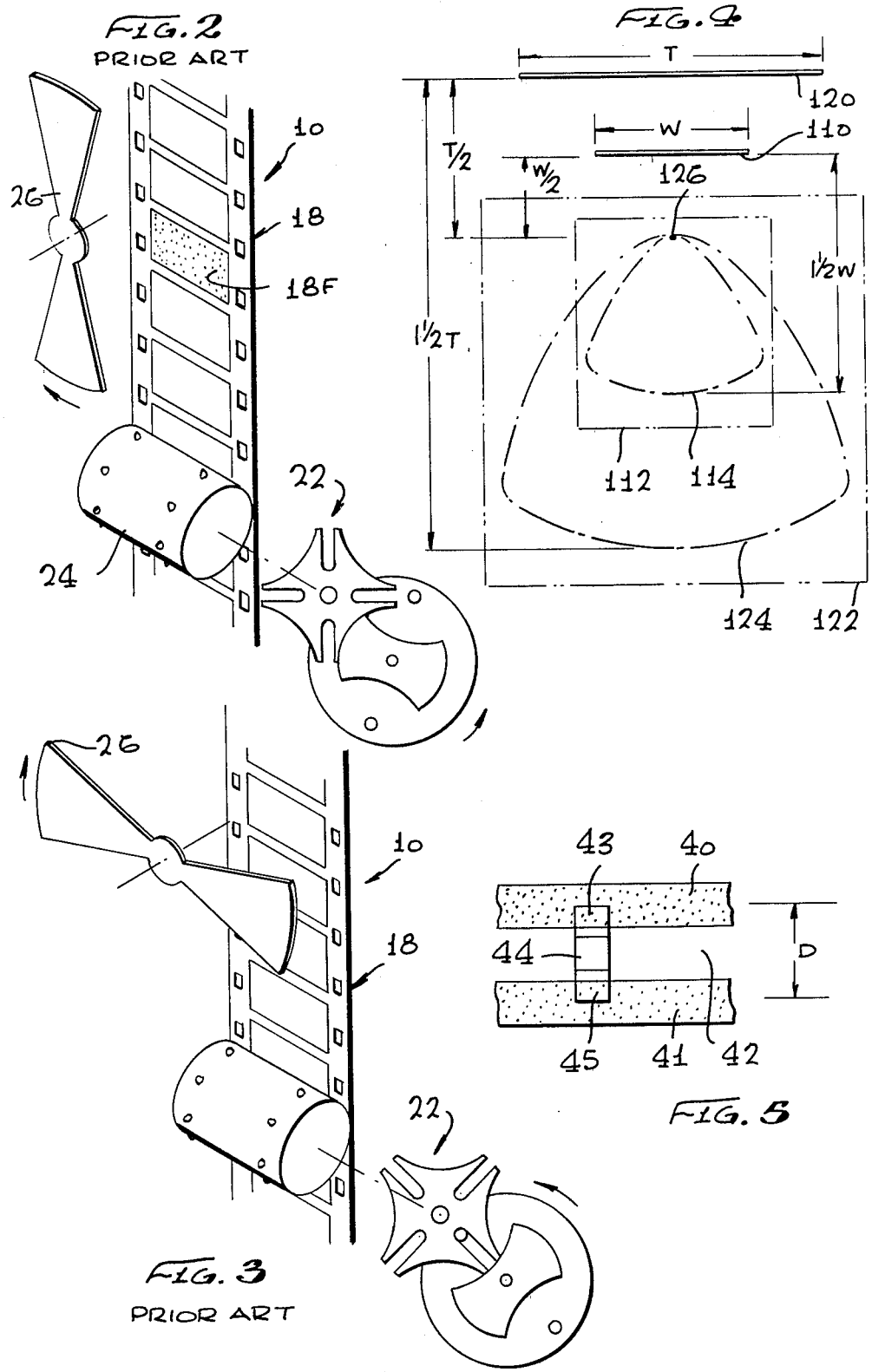

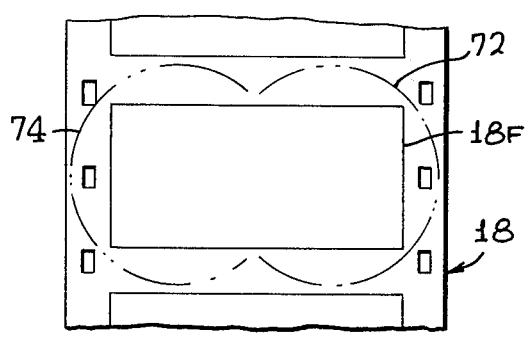
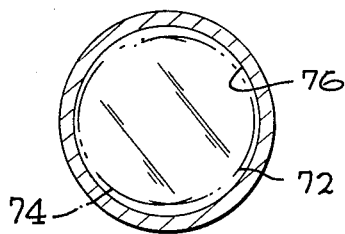
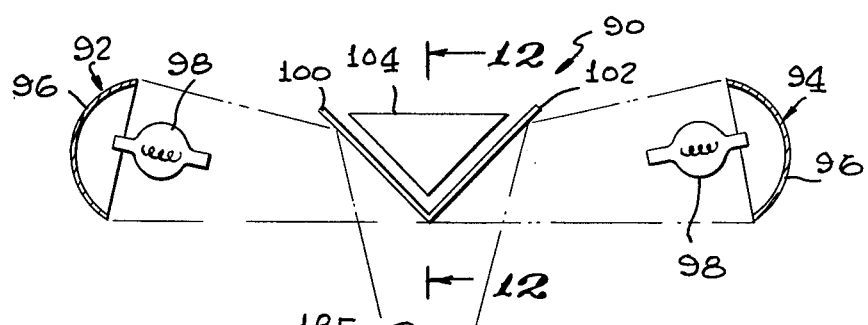
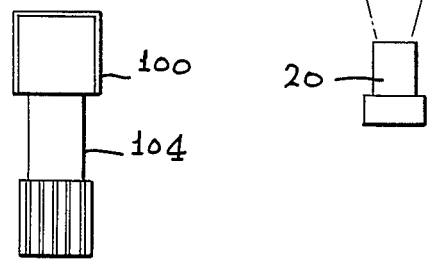
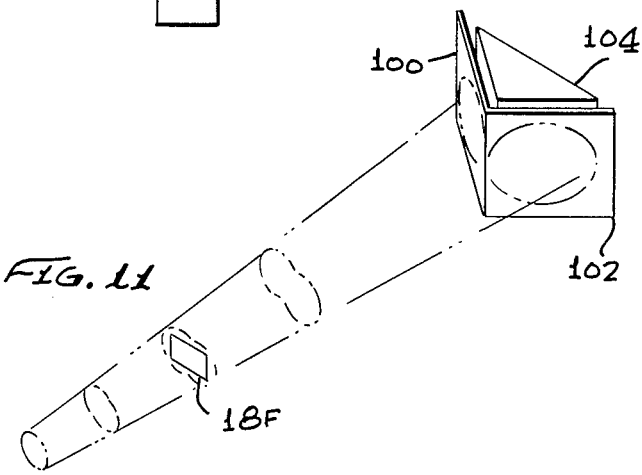

MOTION PICTURE SYSTEM

CROSS-REFERENCE TO RELATED APPLICATIONS

This is a continuation-in-part application Ser. No. 885,901 filed Mar. 13, 1978, now abandoned which was a continuation-in-part of application Ser. No. 713,658 filed Aug. 12, 1976, now abandoned which was a continuation-in-part of application Ser. No. 626,965 filed Oct. 29, 1975, now abandoned.

BACKGROUND OF THE INVENTION

In the early development of the motion picture, as described in an article entitled "Home Movies" which appeared in the *Super 8 Film Maker*, May/June 1974 by Lenny Lipton, experimentation was conducted to determine the ideal parameters. Perhaps the foremost innovator was Thomas Edison who designed the 35 mm format which is still the most widely used theatrical motion picture format worldwide. Edison chose a frame rate of 48 fps (frames per second), which is a rate that was found to avoid observable flickering. However, this rate was later abandoned by the industry as a result of the work of Louis and August Lumier who discovered that flashing each frame a plurality of times can eliminate flicker. They chose a 16 fps rate, but with each frame flashed three times (two interruptions to provide three brief showings) to obtain a 48 per second flashing rate which was found to avoid observable flickering while reducing the required amount of film stock.

Psychologists have observed a "Phi Phenomenon", wherein an illusion of motion is observed when at least about 14 or 16 fresh images or frames per second are shown. Another observed phenomenon is the "persistence of vision" or "critical fusion frequency" phenomenon, wherein flicker is no longer sensed when the images are flashed at a frequency of at least 48 per second. These phenomena are discussed in "Motion Picture Work" by Hulfish pages 81-83, and an article entitled "Is the 18 fps 'Amature' Speed Acceptable for Professional Use?" which appeared in the *Super 8 Film Maker*, by Lenny Lipton. Thus, when 16 fresh frames are shown each second, but with each frame flashed three times, both the "phi" and "critical fusion" requirements are satisfied, and a substantially continuous and flicker-free motion picture image can be observed (at least when the picture quality is not very good). In fact, 16 fps with 3 flashes per frame, became the standard in silent films (such films often appear jerky when shown nowadays, but only because modern equipment shows them at 24 fps with double flashing).

When sound was added to motion pictures in the late 1920's, a faster film speed was needed so the sound track could move fast enough past the sound head to generate good sound fidelity. A rate of 24 fps with double flashing of each frame, which provides 48 flashes per second, was chosen as the standard. This rate has continued from that time to the present, and remains the worldwide standard for commercial theater motion picture projection. Although considerable development work has been done on improving motion picture quality, relatively little has ever been published regarding frame rates since the 24 fps double flash rate standard was adopted; in fact modern articles which have been found on the subject suggest that frame rates of less than 24 fps but with triple flicker should be considered for modern use. It may be noted that very high camera frame rates are sometimes used in scientific experimentation, such as in investigating the impact of a projectile or the flight techniques of birds, but the resulting film is shown at a much lower rate such as 18 fps or 24 fps, but not at the original camera rate. It also may be noted that the use of changeable frame rates of as high as 54 fps has been mentioned in U.S. Pat. No. 3,788,736 by Oulevay. However, he uses this rate because his shutter is open for a fixed percent of every cycle, since it does not have a variable shutter such as are used in professional motion picture cameras used to create commercial theater-quality motion pictures.

Considerable development work has been performed on improving image quality. The graininess of film limits its resolution. Graininess probably was not a problem in the earliest motion picture development by Edison whose development was concerned with peep show display (the nickelodeon). Even in early theatrical display, the problems of accurately aligning subsequent film frames and other technical limitations probably overwhelmed film resolution limitations, as discussed in "A Million and One Nights, A History of The Motion Picture", page 143, by Terry Ramsaye published by Simon and Shuster (1926). However, as camera and projector technology improved, the film resolution limitations have become important, especially as bigger and wider screens have been employed. Wider screens that provide a greater horizontal angle of view have long been recognized as desirable in providing greater realism, but they can result in increased lateral magnification which increases the noticeable graininess. 70 mm wide film was developed in the early 1950's to increase resolution. A technique named Vista Vision was developed in the late 1950's for the wide screen, wherein standard 35 mm film was used but each frame was positioned at a 90° rotation from normal; thus, instead of using standard film frames 0.825 inch wide and 0.446 inch tall, Vista Vision used frames about 0.870" tall and about 1.470" wide (with the 1.470" dimension extending along the length of the film). A technique named Cinerama was developed in the 1950's, wherein three separate projectors using 35 mm film, were used to obtain good image quality over a very wide screen. Presently, 70 mm wide film is occasionally used in commercial entertainment film projection, with an image area of 1.912 inch by 0.870 inch. While these techniques have produced clear, large images in commercial theaters, an even greater degree of realism would be desirable.

SUMMARY OF THE INVENTION

In accordance with one embodiment of the present invention, a method is described for producing a motion picture image that creates a vivid impression of realism in observers. A motion picture is photographed on a strip of film, developed, and projected. The film has sufficient resolution, each frame is large enough, and the camera lens has sufficient resolution, to create a resolution of better than 40 line pairs per milimeter over an area of at least 0.36 square inches. At least this degree of resolution, times the magnification, is also present in the image of each frame projected on the screen. During projection, an illumination level of at least 15 foot lamberts is produced on the screen. The frame rate at which the film is exposed and later projected, is at least 50 frames per second. The combination of high resolution of at least 40 line pairs per milimeter times the projection magnification, the high illumination level of at least 15 foot-lamberts on the screen, and the high frame rate of at least 50 frames per second, results in creation of a vivid image of realism in observers who are viewing the projected image.

The novel features of the invention are set forth with particularity in the appended claims. The invention will be best understood from the following description when read in conjunction with the accompanying drawings.

BRIEF DESCRIPTION OF THE DRAWINGS

FIG. 1 is a partially elevation and partially perspective view of a motion picture system of the prior art.

FIG. 2 is a simplified perspective view of the system of FIG. 1.

FIG. 3 is similar to FIG. 2, except that it shows the prior art system at a later instant.

FIG. 4 is a plan view of a commercial motion picture theaters.

FIG. 5 is a view of two lines showing how resolution can be defined in a system of the present invention.

FIG. 6 is a sectional plan view of a light source constructed in accordance with the present invention.

FIG. 7 is a view taken on line 7—7 of FIG. 6.

FIG. 8 is a partial view taken on the line 8—8 of FIG. 6.

FIG. 9 is a partial view taken on the line 9—9 of FIG. 6.

FIG. 10 is a sectional plan view of a light source constructed in accordance with another embodiment of the invention.

FIG. 11 is a partial perspective view of the source of FIG. 10.

FIG. 12 is a view taken on the line 12—12 of FIG. 10.

DESCRIPTION OF THE PREFERRED EMBODIMENT

FIGS. 1 and 2 illustrate a motion picture projector 10 of a conventional commercial type which can project images on a screen 12. The projector includes a light source 14, and a lens 16 that directs the light through the film 18 and through a lens 20 that focuses the light onto the screen. An intermittent film feeding mechanism 22, shown in FIG. 2, such as a maltese cross type that includes a film-engaging sprocket 24, rapidly moves a film frame 18F to a projecting position directly behind the lens, and holds it there for a short period. During the time when the film frame is being moved to the projecting position, a shutter 26 blocks the light as shown in FIG. 3. In present theater systems, twenty four new film frames per second are positioned at the projecting position. In order to prevent apparent flicker however, each new frame is briefly interrupted by the shutter 26 while the frame is stationary at the projecting position, so that the frame is shown twice, or "flashed" twice, which has been found to generally avoid apparent flickering.

Although considerable development work has been done to improve motion picture quality, the efforts have generally involved adjusting the size, orientation, or the like of the film frame. As described earlier, much of the work done to improve image quality has involved the use of larger film frame size which reduces the effect of film grain especially for projection on large wide screens.

In accordance with the present invention, a method is provided for producing a motion picture image that creates a vivid impression of realism in observers, which is superior to that which has been previously created in motion pictures theaters even when using wide format film and the best of equipment in taking and projecting the motion picture film. In particular, it has been found that when good theater quality resolution is provided along with the use of a high screen illumination level that is as high as is used in the best prior motion picture theaters, that when this is combined with the use of a very high frame rate of at least 50 frames per second, that viewers experience a high degree of realism far superior to that which has been realized heretofore even when high theatre quality motion picture films have been projected using high illumination level.

The resolution of the image projected on a large and high quality theater screen, may be defined in different ways. One definition is the number of line pairs that can be resolved per milimeter. The SMPTE (Society of Motion Picture and Television Engineers) has set a standard of 80 line pairs per milimeter. This "standard" is really a goal and is almost never attained in practice. FIG. 5 illustrates a pair of lines 40, 41 with a space 42 between them, and separated by a distance D. If the distance D is 1/80th mm and the lines can be distinguished, then the resolution is at least 80 line pairs per mm. For standard 35 mm film frames of 0.446 inch height, 900 line pairs can be resolved across the height of the film frame at a resolution of 80 line pairs per mm on the film. At a resolution of 40 line pairs per mm, 450 line pairs can be resolved across the height of the film frame.

Another definition of resolution or potential information or storage capacity, can be based on the proposition that each line and the space between them can represent rows of pixels, such as the pixels 43, 44, 45. Assuming the same resolution in every direction then the information capacity is proportional to the area of the film frame. The "standard" 35 mm film frame has a width of 0.825 inch and a height of 0.446 inch. At a resolution of 80 line pairs per mm, the capacity per film frame based on the above approach is 13.7 million pixels. In practice, professional photographers using typical care and equipment achieve a resolution of about 50% of the SMPTE standard, or about 40 line pairs per mm, and each 35 mm film frame then could be said to have a capacity of about 3.4 million pixels. Color film is readily available that has sufficient grain fineness to permit a resolution of over 80 line pairs per mm.

A projection lens of high resolution can project an image of a film frame on a screen, to produce about the same resolution or capacity of pixels on the screen as are present on the film frame. That is, for a standard 35 mm film frame with a resolution of 40 line pairs per mm, 450 line pairs can be resolved across the height of the projected image.

As mentioned above, the information capacity of a film frame depends on both the area of the film frame and the resolution.

The following table compares the film sizes that are available.

| Film Type | Width-inch | Height-inch | Area-inch$^2$ |
| --- | --- | --- | --- |
| Regular 8 mm | .172 | .130 | .022 |
| Super 8 mm | .208 | .158 | .033 |
| 16 mm | .380 | .286 | .109 |
| "standard" 35 mm | .825 | .446 | .368 |
| Panavision 35 mm | .838 | .700 | .587 |
| 70 mm | 1.912 | .870 | 1.663 |

| Film Type | Width-inch | Height-inch | Area-inch² |
|---|---|---|---|
| IMAX 70 mm | 2.74 | 1.91 | 5.23 |

Almost all home motion pictures are taken on a "Super 8" format, in which the film area of each frame is less than one-tenth the area of "standard" 35 mm frames. Thus, even if the camera and techniques used by professional motion picture photographers were available for home motion pictures, the information capacity per film frame would be much less than on the 35 mm format which is the smallest used in the commercial theater entertainment motion picture industry.

The brightness of the image projected on a screen, is typically measured in terms of the foot lamberts produced when blank (unexposed) portions of the film are projected. In an average commercial motion picture theater, a level of 8 to 10 foot lamberts would be expected, while in a good quality theater, a level of about 12 foot lamberts might be expected. The SMPTE has recommended a level of 16.5 foot lamberts, but this is not achieved in practice. The screen brightness that is observed actually depends on the luminous flux or light intensity projected on the screen and the reflectance of the screen. We have used a Hurley Superglow screen having a gain of 2 (a matt white surface has a gain of 1.7) to obtain maximum brightness with good image quality. Assuming light reflectance of 80%, and a relatively small theater screen which is about 10 feet high and 18 feet wide, a flux of about 3,400 lumen would be required (at 18.5 lumens per square foot) to achieve the present high light intensity of 15 foot lambert even in a relatively small commercial theater.

When professional quality film of a commercial size of at least the standard 35 mm format, and professional techniques are used that produce a resolution of over 40 line pairs per mm, a high quality motion picture can be obtained wherein each frame has over 3.4 million pixels of storage capacity. When this film is developed and then projected, using a high quality theater projector with a good projection lens, the resolution of the image on the screen is limited only by the resolution of the film frame. When such resolution is present along with a high illumination level approaching the suggested 16.5 foot lambert level, or higher, and with the standard commercial rate of 24 frames per second is used, a bright and clear image is produced. However, in accordance with the present invention, it is found that when these factors of high resolution and light level are used, and in addition, the frame rate at which the image was photographed and later projected is at least 50 frames per second and preferably higher, that an unusual phenomenon occurs. Observers of the resulting motion picture image experience a vivid impression of realism which is greatly enhanced from the level achieved when all the factors are the same except that a slower frame rate such as 24 fps is used.

Although the projected image quality must be high, it is not just the information projected on the screen per unit time that results in the realism that applicant obtains. Applicant has made and shown a motion picture using the 70 mm format (1.663 square inches per frame) with a resolution of at least 56 line pairs per mm, and a frame rate of 60 fps. The vivid impression of realism that was created, was not matched by similarly high quality motion pictures taken in the IMAX format (5.23 square inches per frame, but at a 24 fps rate) even though the capacity of information, and the amount of film used, is greater for the IMAX technique. For example, assuming 3.4 million pixels per 35 mm standard frame, there would be 15.4 million pixels per 70 mm frame and 48.3 million pixels per IMAX frame. At 60 fps the 70 mm frame provides 924 million pixels per second, while at 24 fps the IMAX frame provides 1449 million pixels per second. Still, the 70 mm frame at 70 fps provides more realism than the IMAX frame at 24 fps.

While a frame rate progressively greater than 50 fps can produce a progressively superior motion picture image, there appears to be a limit of about 72 fps at which a further rate increase does not produce significant further improvement. Psychological studies were conducted by an independent firm, using 52 persons as subjects, to assess the response of the viewers to different projection frame rates. Motion pictures of the same scenes were taken at six different frame rates at 24, 36, 48, 60, 66 and 72 fps, and were shown to the subjects at the rates at which they were taken, under carefully controlled conditions. Although the comments of viewers show that the overall quality of the image increased with frame rate to about 72 fps, the involuntary galvanic skin response showed this even more clearly.

The vivid impression of realism created by the use of a high frame rate such as 60 fps, occurs only when the projected image is already clear and bright as by the use of film frames having a storage capacity of over 3.4 million pixels per frame, and a high illumination level of at least 15-foot lamberts. The term illumination level means the intensity of light which falls on the screen when a completely transparent (no image) film frame lies behind the projection lens. If the capacity and brightness of the film are much less than these levels, then the use of a high frame rate above 50 fps will not produce a vivid impression of realism. It is also necessary that the photographing and projection be accomplished at professional levels, wherein the film is evenly exposed at the proper light level during photographing, and that the lenses be set to produce a very sharp image during both the photographing and projecting. All of these conditions would not be present simultaneously in home motion pictures taken on the typical 8 mm or super 8 format. In super 8 format, each frame has an area less than one-tenth that of a standard 35 mm frame. Even if a professional level of image sharpness is achieved, such as a resolution of 40 line pairs per mm, then the capacity per frame in the super 8 format, of about 0.3 million pixels, is still about 1/10th that available in commercial theater systems (35 mm stock). Additional degradation of home movie quality as compared to professional theater quality, during photographing, developing, and projecting, results in an even greater discrepancy in projected image quality.

It might be supposed that the size of the film frame should not matter, because home movies are projected on smaller screens, so the image on a film frame is distributed over a smaller area of a small screen; even a theater motion picture may be displayed on screens of different sizes in different theaters. However, viewers can properly view a screen containing a motion picture image only if they place themselves far enough from the screen to view all or most of the screen or at least along the height thereof. FIG. 4 illustrates a relatively small screen 110 of a 1.85 aspect ratio (the width is 1.85 times the height) in a small theater wherein the seats are arranged within the rectangular area 112 to view a screen of width W. The preferred seating area is indicated at 114, which extends between distances W/2 and 1½ W from the screen. In a large theater having a large screen 120 of a width T that is twice as large as the width W, the seats are typically arranged within a rectangular area 122 and the ideal viewing area 124 extends from a distance T/2 to 1½ T from the screen. At the point 126 which is at the front of both viewing areas 114, 124, the width of the screen subtends an angle of about 90° and the height of the screen subtends an angle of about 60°. Most viewers will not feel comfortable sitting closer than about this location, because they then cannot view most of the height of the screen without moving their heads up and down. It may be noted that wide formats have been found to enhance entertainment, by providing an image in the peripheral area of the observer's vision in which background scenery lies, but the primary portion of the image usually lies near the center of the screen.

Another aspect of the present invention relates to a unique light source. Improvements in the programming and technical aspects of television have led to the redirection of motion picture theater entertainment towards those areas in which theater presentations can provide significantly greater entertainment to justify the cost of theater admission. One development is the use of wide screens to extend over a greater portion of the visual field of viewers, and the utilization of wide format (wherein the frame width is at least 1½ times its height) film for projection onto the wide screen. A widely used system for illuminating wide format film includes a xenon lamp and parabolic reflector that generate a circle of light, plus an anamorphic lens for distributing the circle of light into an ellipse that can cover the wide format film. This technique results in a relatively low level of illumination even when high intensity lamps are utilized, because much of the ellipse of light is wasted.

In accordance with another aspect of the invention, an improved light source is provided for wide format film such as the 70 mm type, which efficiently utilizes light and provides a high light level at the wide screen. FIG. 6 illustrates a light source 60 which can be utilized with the projector of FIG. 1, and which is used to illuminate a film frame 18F whose lens 20 projects onto a wide screen. The film frame 18F is of the wide type such as that shown in FIG. 8, so that care must be taken to illuminate opposite sides of the frame at about the same level as the middle thereof. The light source 60 includes a pair of lamps 62, 64 which may be conventional xenon arc lamps, and a pair of reflectors 66, 68 positioned behind the lamps. The lamps are located on opposite sides of the optical axis 70 of the lens, and each reflector is positioned to direct light from its corresponding lamp through the film frame 18F and into the lens 20. Each of the reflectors 68 directs a largely circular bundle of light, as indicated at 72 and 74, these bundles representing a large portion of the light emitted from the lamps, although it should be understood that much of the lamp outputs are diffused. Each of the light bundles of largely circular cross section, are directed so that they fall primarily on a different half of the film frame. Thus, in FIG. 8, the light bundle 72 covers primarily the right half of the film frame, while the other bundle 74 covers primarily the left half of the film frame. In this way, a largely uniform illumination of the film frame is provided, with about the same evenness of light distribution as is obtained when a single lamp and reflector are utilized to illuminate a "squarer" film frame such as a conventional 35 mm type. The reflectors 66, 68 each have mottled reflective surfaces to minimize the intensity and sharpness of "hot spots" where the light is of greatest intensity, although such spots normally will occur at the center of each light bundle 72, 74 and at their overlap at the middle of the frame.

The two light bundles 72, 74 which pass through opposite sides of the film frame, are also directed so that after passing through the film frame they both converge towards the entrance pupil or opening 76 of the lens. The lens opening 76 represents the area at which light can enter the lens for projection onto the screen. FIG. 9 shows the two light bundles 72 and 74 almost completely overlapping and covering most of the pupil entrance area 76 of the lens. Thus, not only is the wide film frame substantially uniformly illuminated, but a very high proportion of the light passing through the wide film frame is then directed into the lens so it can be utilized to illuminate the screen.

The light source 60 can be constructed of largely conventional lamp and reflector components, whose technology has been well developed and is well understood. For example, each of the reflectors 66, 68 may be formed of a parabolic mirror of circular outline, by cutting away a section of the reflector at the side thereof nearest the other reflector. The two reflectors are preferably independently mounted on mounts 78, 80 to permit the reflectors to be individually pivoted to enable adjustment for the most uniform illumination of the film frame. In one light source that was constructed, the reflectors 66, 68 had diameters of 12 inches and were spaced apart by one-quarter inch to permit independent movement. A housing 82 surrounds the lamps and reflectors, to minimize the amount of stray light.

A light source of the type described above, has been constructed and found to provide an illumination intensity of 25 foot lamberts on a wide screen of 68 feet width and 28 feet height. A single one of the same xenon arc lamps, utilized in a conventional light source which included a parabolic mirror and anamorphic lens for distributing the light onto a 70 mm frame, provides a light intensity on the same screen of only about 8 to 10 foot lamberts. Thus, the light source of the present invention not only enables more than one lamp to be utilized to increase the light intensity, but increases the efficiency of utilization of the light, to provide an illumination intensity 2½ to 3 times as great as the illumination provided with a single lamp and anamorphic dispersing lens.

FIGS. 10–12 illustrate another illumination arrangement 90 similar to that of FIG. 6, but utilizing a pair of widely separated lamp and reflector assemblies 92, 94, each assembly including a reflector 96 and a lamp 98. The light source includes a pair of mirrors 100, 102 for directing light from each of the light assemblies, along paths similar to those of the light bundles 72, 74 in FIG. 6, so the light bundles pass through opposite side portions of the wide film frame 18F and converge onto the entrance pupil of the projection lens 20. The mirrors 100, 102 can be of the dichroic type to reflect light in the visible spectrum and pass infrared and/or ultraviolet light. A heat dissipator 104 is positioned between the mirrors to receive the nonvisible light and dissipate it. The heat absorber 104 can be formed of a heat pipe for effectively carrying away the heat to a spaced location where fins can be provided to dissipate the heat into the environment.

By utilizingg a plurality of lamps and reflectors to direct light through opposite sides of a wide format film wherein the film frame width is at least about twice its height, a high screen illumination intensity is produced which adds to the apparent realism and depth of the motion picture. High illumination could cause apparent flicker in prior art motion pictures, but the possibility of such flicker is eliminated when the high frame rate of over 50 fps of the present invention is utilized. While two lamps and reflectors are normally sufficient, it is possible to utilize more. For example, three laterally spaced lamps could be used, with the middle one illuminating the middle sector of the film frame and the other two illuminating the opposite side portions, and with all three beams converging on the lens opening.

Thus, the invention provides a method for producing an entertainment motion picture image that creates a vivid impression of realism in observers that is superior to that which has been created in the past. This is accomplished by photographing and later projecting a motion picture image, where the film frames have a high information storage capacity to create an image of high resolution to an observer in the preferred seating area and are projected at a high light level, at least equal to high quality theater motion picture standards, and where, in addition, the frame rate is at least 50 fps. The information storage capacity of each frame is one wherein each film frame has a resolution of over 40 line pairs per mm and an area of at least 0.36 inches, which is that achieved in good quality photography in the standard 35 mm format. This provides a storage capacity per frame of over 3.4 million pixels per frame, and at least this capacity is available in the image projected on the screen. (Applicant has set a minimum standard of a resolution of 56 line pairs per mm and is using the 70 mm format in his films). The illumination level is at least 15 foot lamberts. When these high quality standards are combined with the high frame rate of at least 50 fps applicant finds that an unusually vivid impression of realism is created in observers of the motion picture image. Of course, it is usual to make copies of the original film and project these copies on screens, so that the description of exposing and projecting a film includes the projecting of a copy of the original exposed film.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A method for producing a motion picture image that creates a heightened physiological response in observers comprising:
    exposing a strip of light sensitive film through a camera lens to form images on individual film frames spaced along the length of the film, at a predetermined constant frame rate; and
    projecting said film strip onto a screen, while advancing said strip at the same frame rate as the one at which the film was exposed;
    said step of exposing and projecting including creating images on said film having a resolution of more than 40 line pairs per milimeter and a frame area of at least 0.36 square inch;
    said step of projecting includes producing an illumination level greater than 16 foot lamberts on said screen; and
    said constant frame rate is from 50 frames per second to 72 frames per second, inclusive.

2. The method described in claim 1 wherein:
    said step of projecting includes passing more than 3400 lumens of light through each frame of said film, said screen is at least 10 feet tall and 18 feet wide, and the flux density projected on said screen is at least 18.5 lumens per square foot for completely transparent frames.

3. The method described in claim 1 wherein:
    each frame of said film has a height of at least 0.446 inch and a width greater than its height.

4. A method for producing a motion picture image that creates a heightened physiological response in observers, comprising:
    taking a motion picture, including focusing light through a camera lens onto an original strip of film, at a predetermined constant frame rate; and
    projecting a strip of film identical to said original film, onto a screen, including passing light through the film and through a projection lens onto a screen, at said predetermined frame rate;
    the amount of light passed through the projected film being sufficient to create an illumination level of more than 18 foot lamberts at the center of the screen;
    the camera lens and projection lens each having sufficient resolution, the film stock having sufficient grain fineness, and the size of each frame being large enough, to provide a resolution of over 900 line pairs along both the width and height of a frame of the film and the image thereof on the screen; and
    said predetermined frame rate is in the range of 50 to 72 frames per second, inclusive.

5. The method described in claim 4 wherein: said frame rate is 60 frames per second.

* * * * *